(12) United States Patent
Schneider et al.

(10) Patent No.: US 7,592,278 B2
(45) Date of Patent: Sep. 22, 2009

(54) GLASS CERAMIC

(75) Inventors: Meike Schneider, Taunusstein (DE); Thilo Zachau, Buerstadt-Riedrode (DE); Jochen Alkemper, Klein-Winternheim (DE); Dirk Sprenger, Stadecken-Elsheim (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/633,679

(22) Filed: Dec. 4, 2006

(65) Prior Publication Data

US 2007/0142199 A1    Jun. 21, 2007

(30) Foreign Application Priority Data

Dec. 5, 2005    (DE) .............. 10 2005 058 759

(51) Int. Cl.
*C03C 10/02*    (2006.01)
(52) U.S. Cl. ............................................. 501/10
(58) Field of Classification Search ............ 501/10
See application file for complete search history.

(56) References Cited

U.S. PATENT DOCUMENTS

| | | | |
|---|---|---|---|
| 3,519,445 A * | 7/1970 | Wilson et al. .......... | 501/10 |
| 4,366,253 A * | 12/1982 | Yagi ...................... | 501/63 |
| 4,508,834 A * | 4/1985 | Gliemeroth et al. ..... | 501/73 |
| 4,576,920 A | 3/1986 | MacDowell | |
| 4,784,977 A * | 11/1988 | Aitken .................. | 501/10 |
| 4,833,104 A | 5/1989 | MacDowell et al. | |
| 6,753,280 B2 * | 6/2004 | Seto et al. .............. | 501/70 |
| 6,927,186 B2 * | 8/2005 | Hulme et al. ........... | 501/70 |
| 7,300,896 B2 * | 11/2007 | Zachau et al. .......... | 501/9 |
| 2005/0096208 A1 | 5/2005 | Zachau et al. | |

FOREIGN PATENT DOCUMENTS

| | | |
|---|---|---|
| JP | 4-160054 | 6/1992 |
| SU | 386858 | * 10/1973 |

* cited by examiner

*Primary Examiner*—Karl E Group
(74) *Attorney, Agent, or Firm*—Harness, Dickey & Pierce, P.L.C.

(57) ABSTRACT

A glass ceramic is specified, with a crystalline phase consisting predominantly of $BPO_4$, and preferably exclusively of $BPO_4$. The glass ceramic contains 10 to 50 wt.-% $SiO_2$, 5 to 40 $B_2O_3$, 25 to 75 wt.-% $P_2O_5$, up to 5 wt.-% refining agents, up to 1 wt.-% impurities, and 0.1 to 10 wt.-% of at least one constituent selected from the group of $M3_2O_3$, $M5_2O_5$ and $M4O_2$, wherein M3 is an element selected from the group of the lanthanoids, yttrium, iron, aluminum, gallium, indium and thallium; wherein M5 is an element selected from the group of vanadium, niobium and tantalum and wherein M4 is an element selected from the group of titanium, zirconium, hafnium and cerium. The glass ceramic is advantageously suitable for being coated with semiconductor materials.

14 Claims, No Drawings

GLASS CERAMIC

BACKGROUND OF THE INVENTION

The invention relates to a glass ceramic that is distinguished by a high thermal and chemical stability and which is suitable, in particular, as a substrate for coating with semiconductor materials such as GaAs, or as a substrate for optical components.

Substrate materials used in coating processes must conform to exacting requirements. The surface of the substrate must meet the highest requirements in respect of roughness, because any existing unevenness can be transferred to any coatings applied. The thermal expansion of the substrate should be adapted to the applied coating in order to avoid detachment upon temperature variations. Depending on the coating process, high thermal stability to at least 800° C. or more is essential. Transparency of the substrate is also desired, depending on the specific application. In many cases, highly transparent substrates make it easier to perform quality checks, for example. A certain amount of light scattering in the substrate may also be required. This is the case in the photovoltaics field, for example, in that the light path in a solar cell can be extended by a specially applied light-scattering layer. To enable perfect cleaning of the substrate, a sufficient chemical resistance against commonly used cleaning agents is also necessary. Furthermore, the substrate materials should be inexpensive and producible in dimensions that can be chosen as far as possible at will. Conventional substrate materials often fail to meet the above requirements to an adequate extent. The use of glass is frequently a non-option due to the necessary deployment at high temperatures, whereas ceramics have disadvantages in respect of surface and forming characteristics. Monocrystals, which mostly provide an ideal solution from the technical perspective, are generally expensive to produce and available only in limited sizes.

Glass ceramics are an appropriate alternative due to their high thermal stability compared to glass, the diversity of molding options known from glass production as well as the possibility of producing them to be transparent.

A glass ceramic is known from US 2005/0096208 A1 that contains 35 to 60 wt.-% $SiO_2$, >4 to 10 wt.-% $B_2O_3$, 0 to 10 wt.-% $P_2O_5$, 16.5 to 40 wt.-% $Al_2O_3$, 1 to 10 wt.-% $TiO_2$, 0 to 8 wt.-% $Ta_2O_5$, 0 to 6 wt.-% $Y_2O_3$, 1 to 10 wt.-% $ZrO_2$, 6 to 20 wt.-% MgO, 0 to 10 wt.-% CaO, 0 to 4 wt.-% SrO, 0 to 8 wt.-% BaO, 0 to 4 wt.-% ZnO, wherein the total content of $SnO_2$ and $CeO_2$ amounts 0 to 4 wt.-%, wherein the total content of $SO_4^{2-}$ and $Cl^-$ amounts to 0 to 4 wt.-%, and wherein the total content of $SnO_2$, $CeO_2$, $SO_4^{2-}$ and $Cl^-$ is between 0.01 and 4 wt.-%. This glass ceramic is suitable, in particular, for production by the float glass method. It has a coefficient of thermal expansion in the range between 4× $10^{-6}$/K and is therefore suitable, for example, as a substrate material for silicon (thermal expansion coefficient of 3.7× $10^{-6}$/K).

However, many technically relevant semiconductors, such as GaAs or other III/V semiconductors, for example, have a significantly higher coefficient of thermal expansion in a range of 5 to 8×$10^{-6}$/K. Thus, the known substrate is not especially suitable for such semiconductors.

In the case of substrates to be used in the field of optical applications, optical transparency and other optical properties are required in addition to the characteristics described above, including, in particular, the optical position in the Abbé diagram and the refractive index.

A glass ceramic consisting of 10 to 50 wt.-% $SiO_2$, 5 to 35 wt.-% $B_2O_3$, 25 to 75 wt.-% $P_2O_5$, wherein the total content of $SiO_2$, $P_2O_5$ and $B_2O_3$ is greater than 90 wt.-%, is known from U.S. Pat. No. 4,576,920. This glass ceramic may also contain up to 10 wt.-% of at least one oxide of the group of $Li_2O$, $Na_2O$, MgO, CaO, SrO, BaO, CdO, ZnO and $SnO_2$, wherein the amount of any single constituent may not exceed 5%. The glass ceramic has $BPO_4$ as its main crystal phase. Its thermal stability is specified as ranging to about 1100° C., with a thermal coefficient of expansion ranging between 4.5 and 6.5×$10^{-6}$/K.

However, it has been found that one disadvantage of this glass ceramic is that it does not have sufficient chemical resistance against acids and/or alkalis. This property is incompatible with use of the glass ceramic in practice, because cleaning processes would attack the surface of the glass ceramic. One way of solving this problem is to increase the amount of silicon in the glass ceramic. However, this option is limited by the meltability of the starting glass at economically interesting temperatures (<1650° C.), which requires a percentage of silicon oxide that is generally less than 50%.

One material having $BPO_4$ as its main crystal phase and containing 50 to 65 wt.-% $SiO_2$ is known from U.S. Pat. No. 4,833,104, but forming is done in this case by sintering due to the higher melting temperature. However, this in turn leads to disadvantages in respect of the forming, transparency and surface quality of the product.

Another sintered material containing $BPO_4$ as its main crystal component is know from JP 04-160054, but because forming is done by powder technology, the material suffers from the same drawbacks as described in the foregoing.

SUMMARY OF THE INVENTION

It is a first object of the present invention to disclose a glass ceramic that can be produced using melting technology and which has sufficient chemical and thermal stability, and whose coefficient of thermal expansion can be adapted within broad limits to the thermal expansion coefficients of modern-day semiconductor materials, in particular.

It is a second of the present invention to disclose a glass ceramic having a high chemical stability against acids or alkalis.

It is a third object of the invention to disclose a glass ceramic having a high thermal stability.

It is another object of the invention to disclose a glass ceramic a method of producing such a glass ceramic.

These and other objects are achieved in accordance with the invention by means of a glass ceramic having the following composition:

| | |
|---|---|
| $SiO_2$ | 10-50 |
| $B_2O_3$ | 5-40 |
| $P_2O_5$ | 25-75 |
| refining agents | $\leq 5$ |
| impurities | $\leq 1$, | and 0.1-10 wt.-% of at least one constituent selected from the group of $M3_2O_3$, $M5_2O_5$ and $M4O_2$;

wherein M3 is an element selected from the group of the lanthanoids, yttrium, iron, aluminum, gallium, indium and thallium;

wherein M5 is an element selected from the group of vanadium, niobium and tantalum;

wherein M4 is an element selected from the group of titanium, zirconium, hafnium and cerium.

With regard to method, the object of the invention is achieved with a method for producing a glass ceramic, in which a base glass with the following composition (in wt.-%) is firstly melted:

| | |
|---|---|
| $SiO_2$ | 10-50 |
| $B_2O_3$ | 5-40 |
| $P_2O_5$ | 25-75 |
| refining agents | <5 |
| impurities | <1, | and 0.1-10 wt.-% of at least one constituent is selected from the group of $M3_2O_3$, $M5_2O_5$ and $M4O_2$;

wherein M3 is an element selected from the group of the lanthanoids, yttrium, iron, aluminum, gallium, indium and thallium;

wherein M5 is an element selected from the group of vanadium, niobium and tantalum;

wherein M4 is an element selected from the group of titanium, zirconium, hafnium and cerium.

and said base glass is subsequently subjected to thermal treatment for ceramization until a crystalline phase has formed that consists predominantly of $BPO_4$.

The glass ceramic of the invention is advantageously suitable as a substrate for a coating that is preferably temperature-resistant to at least 800° C., but which can be temperature-resistant even to about 1200° C.

It is possible here to adapt the thermal expansion of the substrate to different coatings, and the substrate is specifically suitable for coating with semiconductor materials to a particularly advantageous degree.

The glass ceramic according to the invention is also suitable for being coated with GaAs and can therefore be used to advantage in the manufacture of solar cells.

With the glass ceramic according to the invention and the method for producing such a glass ceramic, a glass ceramic is provided whose thermal expansion can be adapted within a range from 4.5 to $8.5 \times 10^{-5}$/K (in a temperature range from 20 to 700° C.) and which thus enables the coefficient of thermal expansion to be increased to those of present-day semiconductor substrates and which at the same time has a high thermal stability of at least 800° C., as well as good chemical stability. It has been found, unexpectedly, that the chemical stability and the thermal stability of the glass ceramic can be significantly improved by adding oxides of trivalent or pentavalent metals (such as $Al_2O_3$, $La_2O_3$, $Nd_2O_3$, $Nb_2O_5$, $Ta_2O_5$) or oxides of tetravalent transition metals (such as titanium and zirconium, for example). At the same time, the thermal expansion and the transparency can be varied within a broad range, such that the material can be ideally adapted to many applications, e.g. as a substrate for semiconductor coatings or for optical components.

A glass ceramic within the meaning of this application is understood to be a material that, commencing with a glass produced with melting technology, is transformed in a controlled manner into a partially crystalline glass body. Materials of similar composition made by sintering methods are not included in this definition.

The glass ceramic according to the invention may contain common fining and fluxing agents such as $As_2O_3$, $Sb_2O_3$ in the usual amounts of up to 5 wt.-%, preferably up to 3 wt.-%. Other impurities that are imported along with the usual technical raw materials should not exceed 1 wt.-%, and preferably not exceed 0.5 wt.-%.

The glass ceramic according to the invention preferably has a crystalline phase consisting predominantly of $BPO_4$, preferably to at least 90%, wherein $BPO_4$ is preferably the only crystalline phase.

In another advantageous configuration, the glass ceramic according to the invention contains at least 0.5 wt.-% of at least one constituent selected from the group of $M3_2O_3$, $M5_2O_5$ and $M4O_2$.

Preferably, however, at least 1 wt.-% of $M3_2O_3$, $M5_2O_5$ and/or $M4O_2$ is added.

It is also advantageous when the sum of the constituents selected from the group of $M3_2O_3$, $M5_2O_5$ und $M4O_2$ is at most 5 wt.-%, with the amount of each single constituent preferably being 3 wt.-% at most.

A particularly good chemical stability can be achieved by means of these features.

According to another configuration of the invention, the components $P_2O_5$ and $B_2O_3$ are contained in a molar ratio of between 1:1 and 1:2.

The phosphorus contained in the glass ceramic is predominantly bound inside the crystal phase.

According to another configuration of the invention, the glass ceramic is substantially free of alkali metal oxides, wherein the total content of alkali metal oxides is preferably 1 wt.-% at most, and preferably 0.5 wt.-% at most.

Due to this almost complete absence of alkalis, disadvantageous properties resulting from the diffusion of alkalis in semiconductor coating materials are avoided. Alkali diffusion is generally associated with corrosion, bloom and detachment of layers (e.g. due to formation of alkaline carbonates). The electronic band structure of semiconductor materials can also be critically disturbed by alkalis.

The glass ceramic according to the invention is thermally stable to at least 800° C., preferably even to around 1200° C. at least.

The glass ceramic according to the invention can be produced as a transparent, translucent or opaque material by selecting a suitable ceramization program.

Furthermore, the glass ceramic according to the invention can be produced so that it is optical transparent, whereby a transparency across the visible light spectrum (380 nm-780 nm) of at least 50% or more can be achieved.

According to another configuration of the invention, the glass ceramic is thermally stable to at least 800° C., preferably to 980° C., without its transparency being impaired.

These properties are especially advantageous, particularly when the optical properties play a special role.

Such transparent glass ceramics are characterized in that they have a refractive index $n_d$ of between 1.5 and 1.6 and an Abbé value $v_d$ of between 65 and 68.

The chemical stability of the glass ceramic according to the invention is significantly improved compared to conventional glass ceramics which have $BPO_4$ as their main crystal phase.

The acid resistance of the inventive glass ceramic pursuant to DIN 12116, defined in terms of measured weight loss, is 15 mg/dm² at most, and preferably 12 mg/dm² at most.

The alkali resistance of the inventive glass ceramic pursuant to DIN/ISO 695, defined in terms of measured weight loss, is 350 mg/dm² at most, and preferably 300 mg/dm² at most.

Another advantage of the glass ceramic according to the invention is its low dielectric constant ($\epsilon < 4.5$ at 1 MHz). This is advantageous when used as a substrate for electronic components.

DETAILED DESCRIPTION OF THE PREFERRED EMBODIMENTS

In the following preferred embodiments are disclosed which are explained with respect to several examples.

EXAMPLES

Glass types with the compositions specified in Table 1 were melted and homogenized in a platinum crucible at temperatures between 1650 and 1680° C. The glass melt was cast as flat blocks and thermally relaxed at temperatures of approximately 10 to 20 K above the transformation temperature of the respective glass, and slowly cooled to room temperature. A DTA (differential thermal analysis) measurement was then performed on each glass. The DTA curves of the glass show a single exothermic peak at 800 to 950° C. that mirrors the crystallization of BPO4. Other peaks indicating the formation of other crystal phases were not detected.

For transformation into a glass ceramic, the glass was heated at a heating rate of 5 K/min to the crystallization temperature, kept at that temperature for two hours and then cooled.

The ideal crystallization temperature for producing a transparent glass ceramic was determined in a temperature gradient with the aid of ceramization processes familiar to a person skilled in the art.

For each of the glass types, the thermal expansion in the range between 20° C. and 700° C., the transparency vis for visible Licht (for 4 mm sample thickness), the refractive index nd, the Abbé value vd and the chemical resistance against acids (DIN 12116) and alkalis (DIN/ISO 695) were determined. The results are compiled in Table 1.

TABLE 1

| | Example | | | | | |
|---|---|---|---|---|---|---|
| | 1 | 2 | 3 | 4 | 5 | 6 |
| | Composition (wt.-%) | | | | | |
| $B_2O_3$ | 19.29 | 19.37 | 18.66 | 18.47 | 19.52 | 19.74 |
| $P_2O_5$ | 39.33 | 39.49 | 40.05 | 39.64 | 39.80 | 40.24 |
| $SiO_2$ | 39.12 | 39.29 | 39.85 | 39.43 | 40.08 | 40.02 |
| M3: | 2.26% | | 1.45% | 1.44% | | |
| | $La_2O_3$ | | $Al_2O_3$ | $Al_2O_3$, | | |
| $M4O_2$ | | | | 1.03% | 0.60% | |
| | | | | $ZrO_2$ | $TiO_2$ | |
| $M5_2O_5$ | | 1.85% | | | | |
| | | $Nb_2O_5$ | | | | |
| Ceramization temperature | 830° C. | 880° C. | 880° C. | 880° C. | 900° C. | 830° C. |
| DTA peak | 854° C. | 869° C. | 896° C. | 922° C. | | 857° C. |
| Linear coefficient of thermal expansion ($10^{-6}$/K, 20-700° C.) | 4.99 | 5.15 | 5.61 | 5.58 | 5.75 | 6.04 |
| Transparency ($\tau_{vis}$, 4 mm) | 82% | 58% | 54% | 65% | 67%[1] | 80% |
| $n_d$ | 1.5280 | 1.5337 | 1.5258 | 1.5259 | | 1.5303 |
| $v_d$ | 70.06 | 67.20 | 71.28 | 69.93 | | 71.06 |
| Weight loss in acid (DIN 12116, mg/dm²) | 10 | 1.5 | 6 | 8 | 0.4 | 15 |
| Weight loss in aqueous alkali (DIN/ISO 695, mg/dm²) | 121 | 223 | 213 | 210 | 162 | 367 |

[1]On addition of 0.5% $As_2O_3$: 89.4%

Examples 1 to 5 show a clear improvement in chemical resistance compared to Comparative Example 6, which does not belong to the invention, and to which no metal oxides were added.

Example 1 shows the positive effect of adding $La_2O_3$, which resulted in a significant improvement in the chemical resistance against aqueous NaOH solution, especially. Addition of $Nb_2O_5$ (Example 2), in contrast, shows a substantial improvement in acid resistance.

The addition of $Al_2O_3$ and $ZrO_2$, as applied in Examples 3 and 4, increases the thermal stability of the glass ceramic. This can be seen, for example, in the increase in the temperature at which the crystallization peak occurs. Experiments with various ceramization temperatures show that the maximum application temperature of the transparent glass ceramic correlates directly with the position of the DTA peak. Generally speaking, the ceramization temperature can be selected in a range of approximately 30° C. about the peak temperature when the intention is to produce transparent glass ceramics. Below this range, complete crystallization of $BPO_4$ does not occur in economically interesting time periods, whereas the upper limit of the ceramization temperature is defined by the glass ceramic becoming opaque. Experiments with different ceramization times have shown that complete ceramization (i.e. when the maximum possible amount of the $BPO_4$ crystal phase has been separated out) has already occurred after two hours. Therefore, longer ceramization times generally have no further influence on the ratio of crystal phase and residual glass phase.

An especially good chemical resistance is obtained in Example 5. This is attributable to the addition of $TiO_2$.

The maximum application temperature is at least as high as the ceramization temperature, although values of up to about 1200° C. can be reached.

What is claimed is:

1. A glass ceramic, having a composition consisting of (in wt.-%):

| | |
|---|---|
| $SiO_2$ | 10-50 |
| $B_2O_3$ | 5-40 |
| $P_2O_5$ | 25-75 |
| refining agents | $\leq 5$ |
| impurities | $\leq 1$, | and 0.1-10 wt.-% of at least one constituent selected from the group consisting of $M3_2O_3$, $M5_2O_5$ and $M4O_2$;

wherein M3 is an element selected from the group consisting of the lanthanoids, yttrium, iron, aluminum, gallium, indium and thallium;

wherein M5 is an element selected from the group consisting of vanadium, niobium and tantalum;

wherein M4 is an element selected from the group consisting of titanium, zirconium, hafnium and cerium;

said glass ceramic having an optical transparency of at least 50% in the range of 380 nm to 780 nm.

2. The glass ceramic of claim 1, wherein at least 90% of the crystalline phase consist of $BPO_4$.

3. The glass ceramic of claim 1, having at least 0.5 wt.-% of at least one constituent selected from the group consisting of $M3_2O_3$, $M5_2O_5$ and $M4O_2$.

4. The glass ceramic of claim 1, having at least 1 wt.-% of at least one constituent selected from the group consisting of $M3_2O_3$, $M5_2O_5$ and $M4)_2$.

5. The glass ceramic of claim 4, in which the sum of the constituents selected from the group consisting of $M3_2O_3$, $M5_2O_5$ and $M4O_2$ is 5 wt.-% at most.

6. The glass ceramic of claim 1, having at most 3 wt.-% of a constituent selected from the group consisting of $M3_2O_3$, $M5_2O_5$ and $M4O_2$.

7. The glass ceramic of claim 1, in which the components $P_2O_5$ and $B_2O_3$ are present in a molar ratio of between 1:1 and 1:2.

8. The glass ceramic of claim 1, having a coefficient of thermal expansion of 4.5 to 8.5 $\times 10^{-6}$/K in the temperature range between 20° C. and 700° C.

9. The glass ceramic of claim 1, which is thermally stable up to 800° C. at least.

10. The glass ceramic of claim 1, which is thermally stable up to 800° C. at least, without its transparency being impaired.

11. The glass ceramic of claim 10, having a refractive index $n_d$ of between 1.5 and 1.6.

12. The glass ceramic of claim 11, having an Abbé number $V_d$ of between 65 and 80.

13. The glass ceramic of claim 1, having an acid resistance with a weight loss according to DIN 12116 of 12 mg/dm$^2$ at most.

14. The glass ceramic of claim 1, having an alkali resistance with a weight loss according to DIN/ISO 695 of 300 mg/dm$^2$ at most.

* * * * *

UNITED STATES PATENT AND TRADEMARK OFFICE
CERTIFICATE OF CORRECTION

PATENT NO. : 7,592,278 B2
APPLICATION NO. : 11/633679
DATED : September 22, 2009
INVENTOR(S) : Schneider et al.

It is certified that error appears in the above-identified patent and that said Letters Patent is hereby corrected as shown below:

Column 8,
Line 17, "M4)$_2$" should be -- M4O$_2$ --.
Line 23, "M$_4$O$_2$" should be -- M4O$_2$ --.

Signed and Sealed this

Seventeenth Day of November, 2009

David J. Kappos
*Director of the United States Patent and Trademark Office*